(12) United States Patent
Mugiraneza

(10) Patent No.: US 10,802,633 B2
(45) Date of Patent: Oct. 13, 2020

(54) DISPLAY WITH BUILT-IN TOUCH PANEL

(71) Applicant: Sharp Kabushiki Kaisha, Sakai, Osaka (JP)

(72) Inventor: Jean Mugiraneza, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/331,555

(22) PCT Filed: Sep. 11, 2017

(86) PCT No.: PCT/JP2017/032717
§ 371 (c)(1),
(2) Date: Mar. 8, 2019

(87) PCT Pub. No.: WO2018/051955
PCT Pub. Date: Mar. 22, 2018

(65) Prior Publication Data
US 2019/0196639 A1 Jun. 27, 2019

(30) Foreign Application Priority Data

Sep. 15, 2016 (JP) .................................. 2016-180999

(51) Int. Cl.
*G06F 3/041* (2006.01)
*G06F 3/044* (2006.01)
(Continued)

(52) U.S. Cl.
CPC ........ *G06F 3/0412* (2013.01); *G02F 1/13338* (2013.01); *G06F 3/044* (2013.01);
(Continued)

(58) Field of Classification Search
CPC .......... G06F 3/044; G06F 3/046; G06F 3/041; G06F 2203/04106; G06F 2203/04114
See application file for complete search history.

(56) References Cited

U.S. PATENT DOCUMENTS

2008/0238885 A1* 10/2008 Zachut ................... G06F 3/046
345/174
2009/0231299 A1 9/2009 Shi
(Continued)

FOREIGN PATENT DOCUMENTS

JP 2011-185680 A 9/2011
JP 2014-174713 A 9/2014
(Continued)

OTHER PUBLICATIONS

Official Communication issued in International Patent Application No. PCT/JP2017/032717, dated Oct. 17, 2017.

*Primary Examiner* — Liliana Cerullo
(74) *Attorney, Agent, or Firm* — Keating & Bennett, LLP

(57) ABSTRACT

The present invention makes it possible to recognize proximity of a coil without an increase in material cost and production cost. A liquid crystal display panel includes a TFT substrate (6) and a CF substrate (7). A touch panel (2) includes (i) a plurality of touch sensing electrodes (3) which are provided on the TFT substrate (6) so as to detect an electric capacitance between the touch panel (2) and a subject of a touch or a change in the electric capacitance and (ii) a proximity sensing electrode (4) which is provided on the CF substrate (7) so as to detect proximity of a coil (10).

7 Claims, 11 Drawing Sheets

(51) Int. Cl.
  *G02F 1/1333* (2006.01)
  *G06F 3/046* (2006.01)
  *G02F 1/1335* (2006.01)
  *G06K 19/07* (2006.01)

(52) U.S. Cl.
  CPC ............ *G06F 3/046* (2013.01); *G06F 3/0416* (2013.01); *G06F 3/0443* (2019.05); *G06F 3/04162* (2019.05); *G06F 3/041662* (2019.05); *G02F 1/133512* (2013.01); *G02F 1/133514* (2013.01); *G06F 2203/04106* (2013.01); *G06F 2203/04108* (2013.01); *G06F 2203/04114* (2019.05); *G06K 19/0723* (2013.01)

(56) References Cited

U.S. PATENT DOCUMENTS

| | | | |
|---|---|---|---|
| 2011/0216032 A1 | 9/2011 | Oda et al. | |
| 2014/0078104 A1* | 3/2014 | Lee | G06F 3/044 345/174 |
| 2016/0018940 A1* | 1/2016 | Lo | G06F 3/044 345/174 |
| 2016/0202802 A1 | 7/2016 | Ono et al. | |
| 2016/0306489 A1* | 10/2016 | Mizuhashi | G06F 3/046 |
| 2016/0349915 A1* | 12/2016 | Sekizawa | G06F 3/04886 |
| 2020/0042118 A1* | 2/2020 | Mugiraneza | G06F 3/041 |

FOREIGN PATENT DOCUMENTS

| | | |
|---|---|---|
| JP | 2016-126695 A | 7/2016 |
| JP | 2016-206791 A | 12/2016 |

* cited by examiner

DISPLAY WITH BUILT-IN TOUCH PANEL

TECHNICAL FIELD

The present invention relates to a display with a built-in touch panel that can detect a touch location and detect proximity of a coil.

BACKGROUND ART

A display device that can detect proximity of a coil is known as a conventional technique (Patent Literature 1). According to a touch control display screen disclosed in Patent Literature 1, an induction layer constituted by a wire lattice is provided behind a display screen. The wire lattice in the induction layer is made up of wires extending in an X-axis direction and wires extending in a Y-axis direction, and constitutes an electromagnetic induction antenna array that recognizes proximity of an induction element such as a coil.

CITATION LIST

Patent Literature

Patent Literature 1: US Patent Application Publication No. 2009/0231299 (Publication date: Sep. 17, 2009)

SUMMARY OF INVENTION

Technical Problem

However, according to the conventional technique as above described, the induction layer constituted by the wire lattice is provided behind the display screen, and it is thus necessary to additionally provide the member for recognizing proximity of a coil. This causes a problem that a material cost and a production cost increase for recognizing proximity of a coil.

The present invention is accomplished in view of the problem, and its object is to provide a display with a built-in touch panel that can recognize proximity of a coil without an increase in material cost and production cost.

Solution to Problem

In order to attain the object, a display with a built-in touch panel in accordance with an aspect of the present invention includes: a touch panel; and a display incorporated with the touch panel, the display including (i) a circuit substrate, (ii) a counter substrate which is provided so as to face the circuit substrate, and (iii) a liquid crystal layer which is provided between the circuit substrate and the counter substrate, the touch panel including a plurality of touch sensing electrodes and a proximity sensing electrode, the plurality of touch sensing electrodes being provided on at least one of the circuit substrate and the counter substrate so as to detect an electric capacitance between the touch panel and a subject of a touch or a change in the electric capacitance, the proximity sensing electrode being provided on at least one of the circuit substrate and the counter substrate so as to detect proximity of a coil.

Advantageous Effects of Invention

According to an aspect of the present invention, it is possible to bring about an effect of providing a display with a built-in touch panel that can recognize proximity of a coil without an increase in material cost and production cost.

BRIEF DESCRIPTION OF DRAWINGS (a) of FIG. 1 is a perspective view schematically illustrating a configuration of a liquid crystal display panel in accordance with Embodiment 1, and (b) of FIG. 1 is a cross-sectional view of the liquid crystal display panel.

Figure 9:
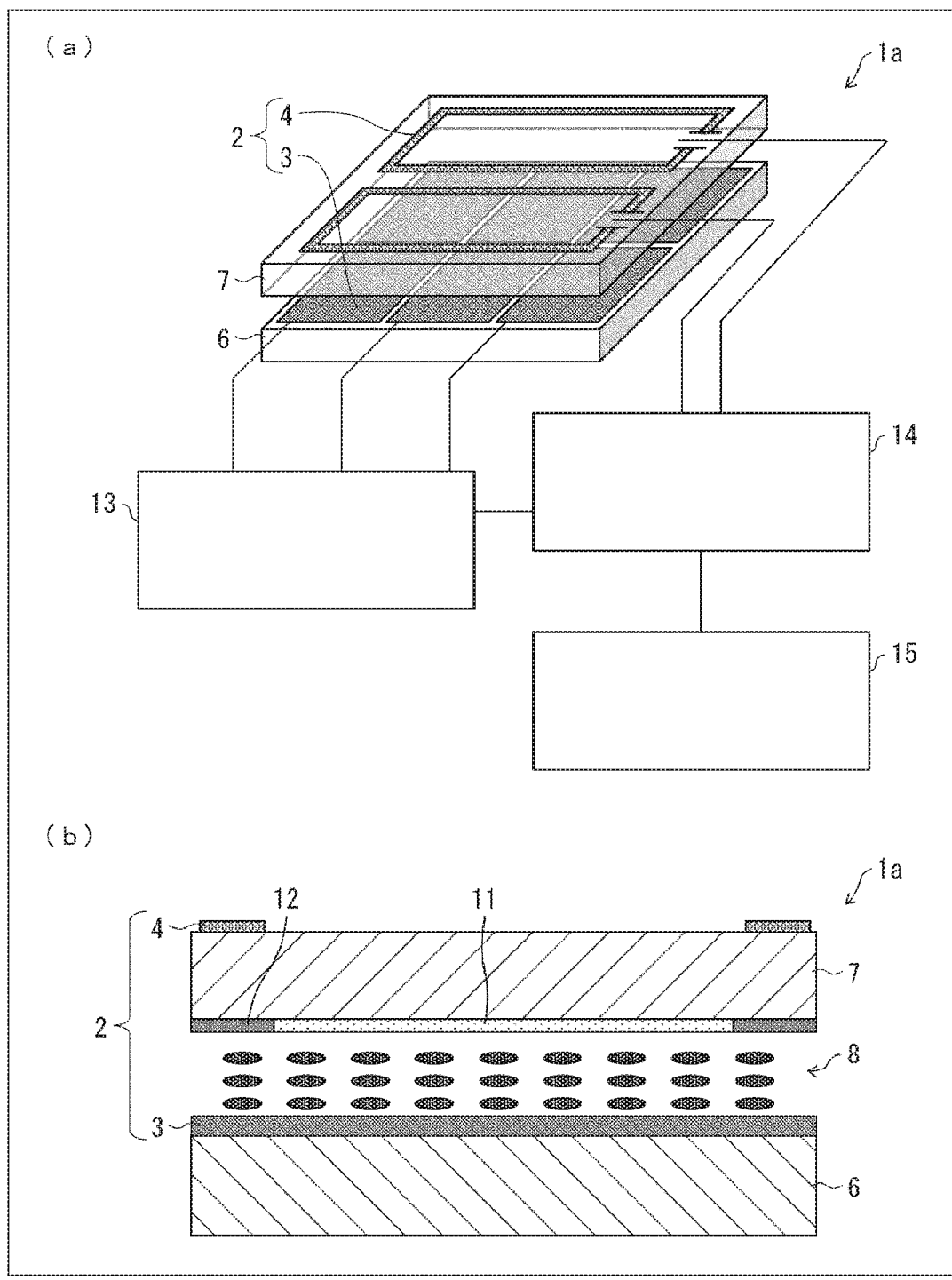

(a) of FIG. 9 is a perspective view schematically illustrating a configuration of a liquid crystal display panel in accordance with Embodiment 2, and (b) of FIG. 9 is a cross-sectional view of the liquid crystal display panel.

Figure 10:
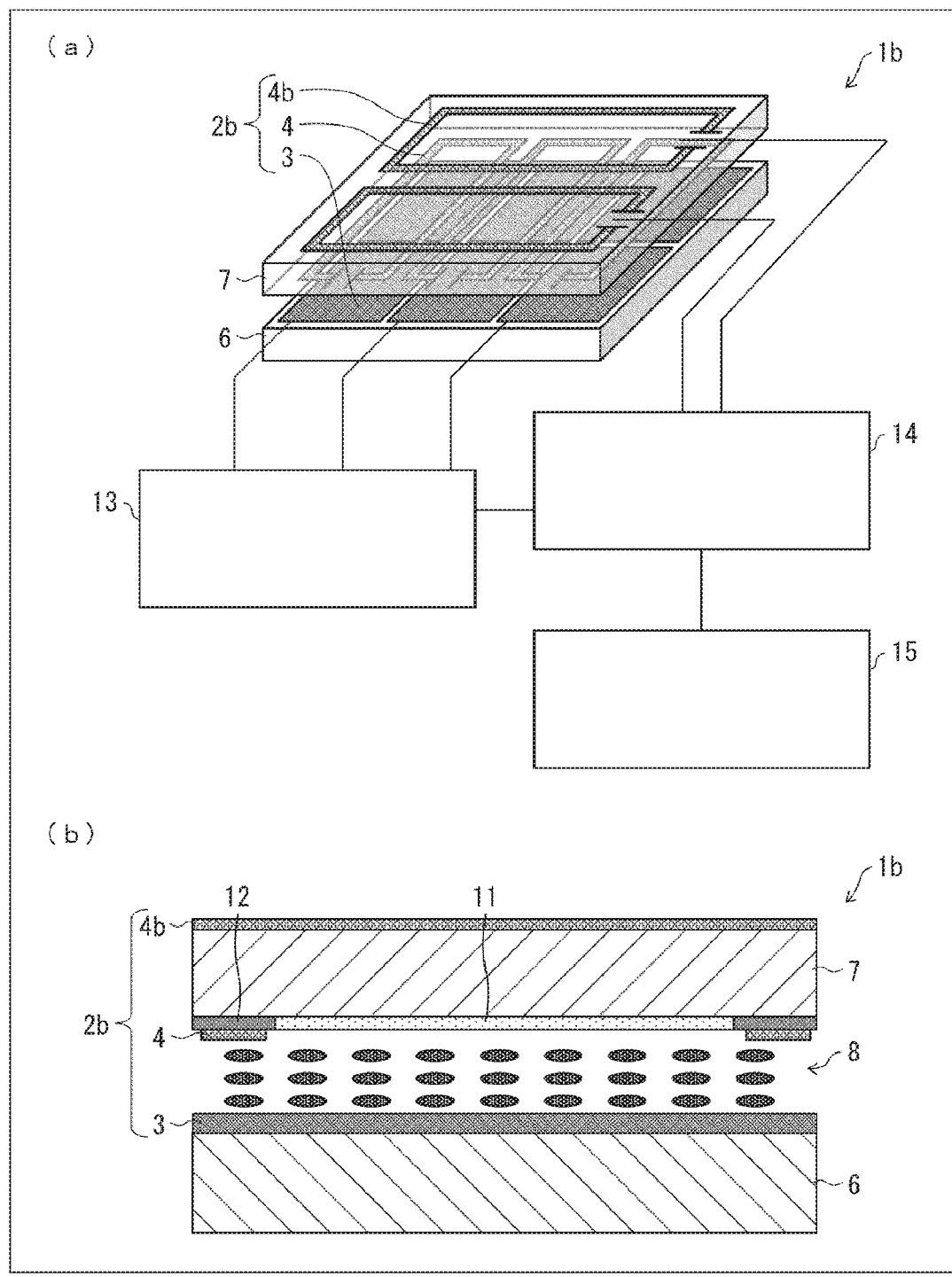

(a) of FIG. 10 is a perspective view schematically illustrating a configuration of a liquid crystal display panel in accordance with Embodiment 3, and (b) of FIG. 10 is a cross-sectional view of the liquid crystal display panel.

Figure 11:
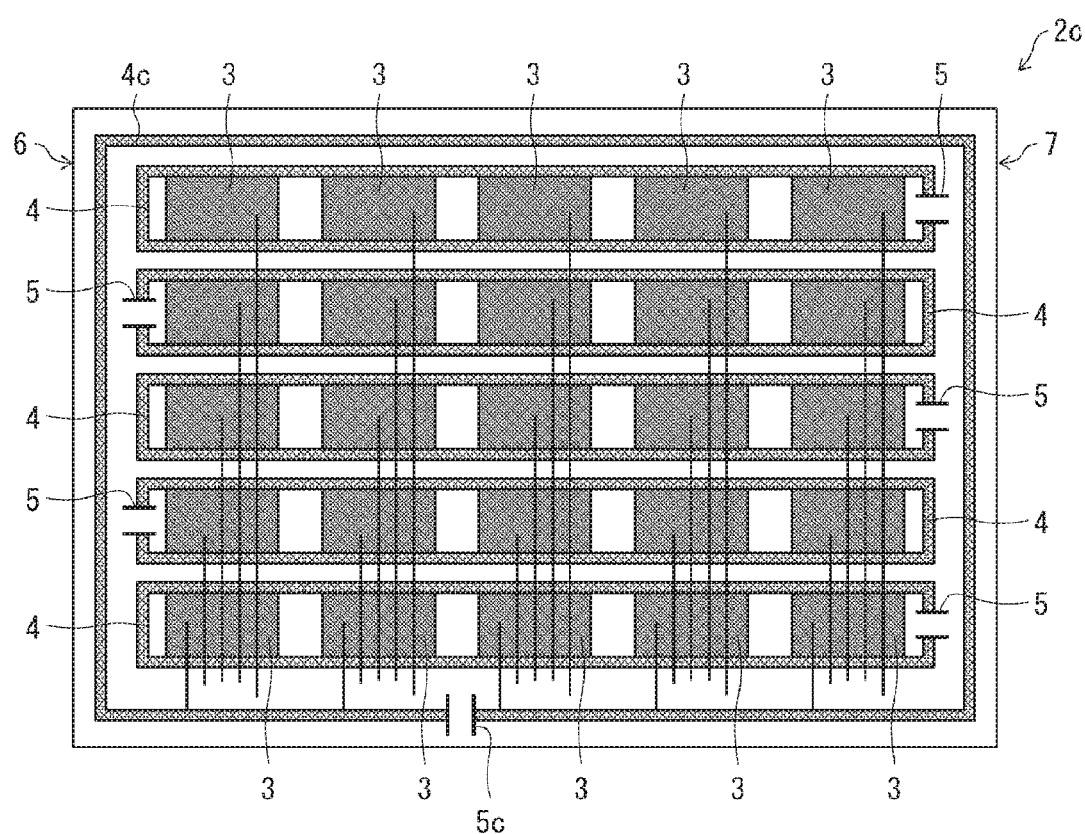

FIG. 11 is a plan view illustrating a configuration of a touch panel in accordance with Embodiment 4.

Figure 12:
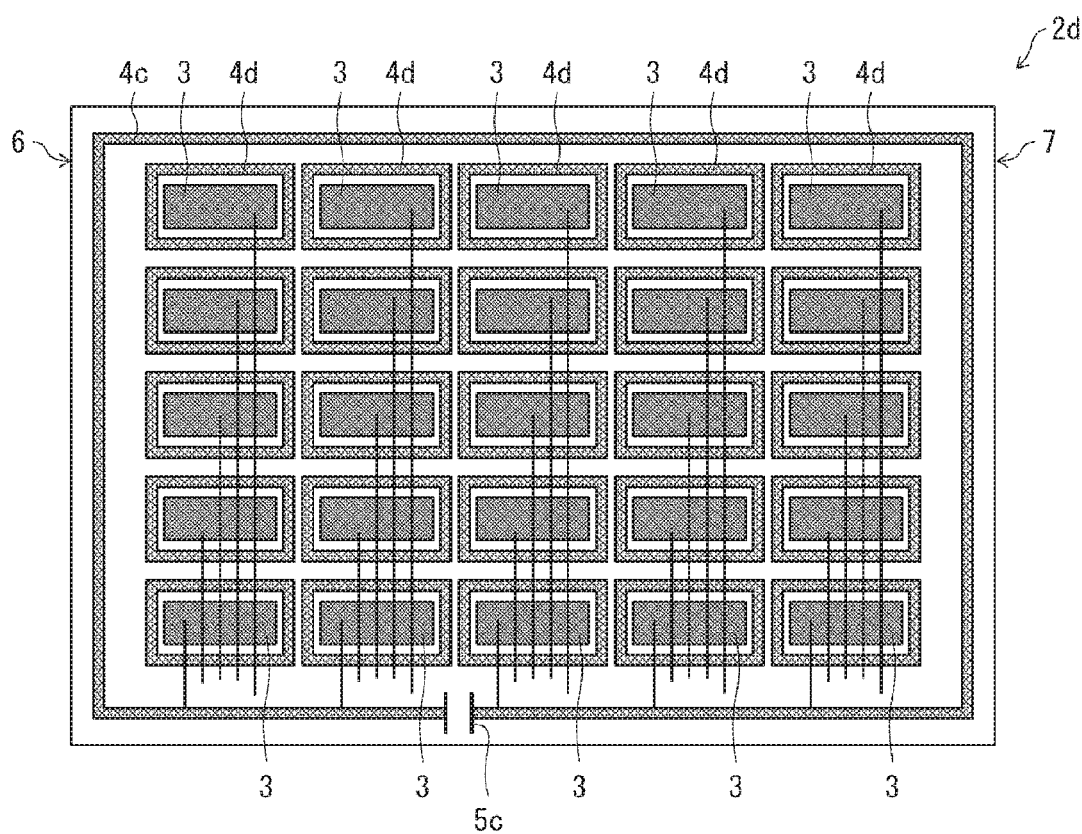

FIG. 12 is a plan view illustrating a configuration of a touch panel in accordance with Embodiment 5.

DESCRIPTION OF EMBODIMENTS

The following description will discuss embodiments of the present invention in detail.

Embodiment 1

(Configuration of Liquid Crystal Display Panel 1)

Figure 1:
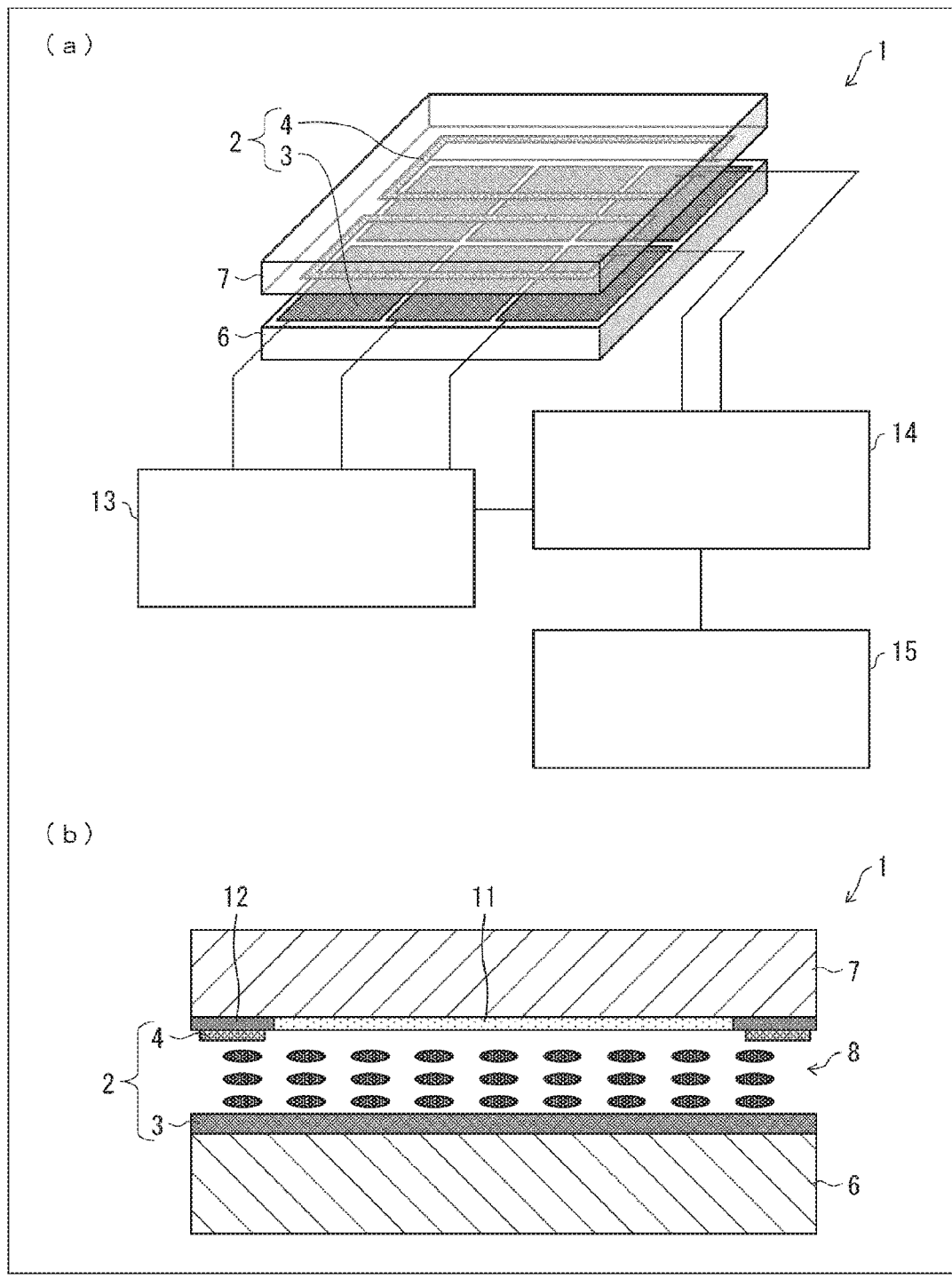

(a) of FIG. 1 is a perspective view schematically illustrating a configuration of a liquid crystal display panel 1 (display with a built-in touch panel, display) in accordance with Embodiment 1, and (b) of FIG. 1 is a cross-sectional view of the liquid crystal display panel 1. The liquid crystal display panel 1 is incorporated with a touch panel 2, and includes (i) a thin film transistor (TFT) substrate 6 (circuit substrate), (ii) a color filter (CF) substrate 7 (counter substrate) that is provided so as to face the TFT substrate 6, and (iii) a liquid crystal layer 8 that is provided between the TFT substrate 6 and the CF substrate 7.

The touch panel 2 includes a plurality of touch sensing electrodes 3 and a plurality of proximity sensing electrodes 4. The plurality of touch sensing electrodes 3 are provided on a liquid crystal layer 8 side of the TFT substrate 6 so as to detecting an electric capacitance between the touch panel 2 and a subject of a touch or a change in the electric capacitance. The plurality of proximity sensing electrodes 4 are provided on a liquid crystal layer 8 side of the CF substrate 7 so as to detect proximity of a coil 10 (see FIG. 6) that is provided in a radio frequency identifier (RFID) device 9.

The liquid crystal display panel 1 includes (i) a touch panel controller 13 which is connected with the plurality of touch sensing electrodes 3, (ii) a modulator 14 which is connected with the plurality of proximity sensing electrodes and the touch panel controller 13, and (iii) an electromagnetic signal generator 15 which is connected with the modulator 14.

Figure 2:
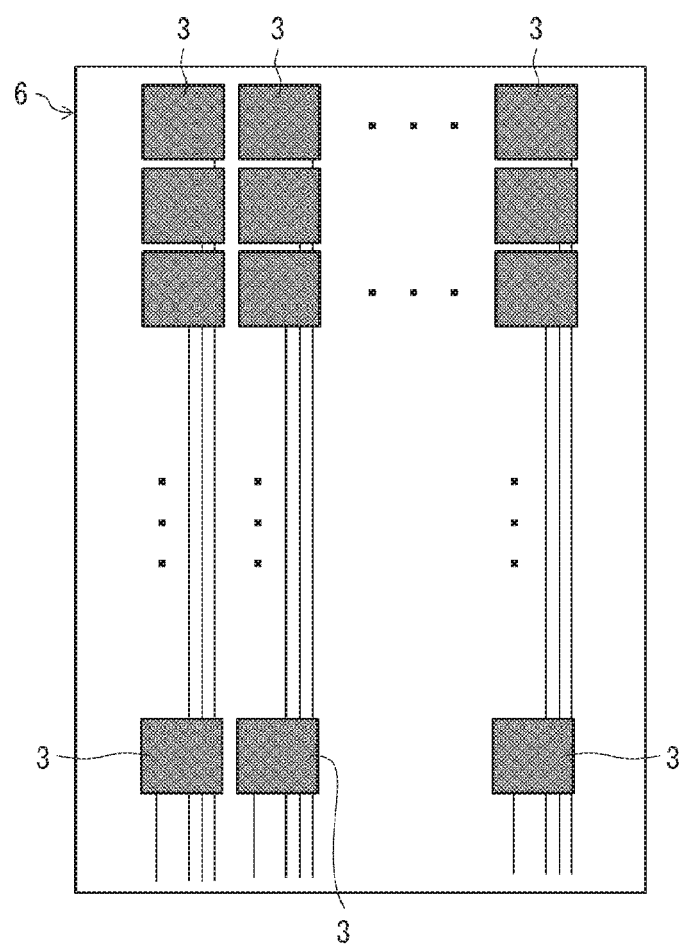
FIG. 2 is a plan view illustrating an arrangement of touch sensing electrodes which are provided on a TFT substrate in the liquid crystal display panel.

FIG. 2 is a plan view illustrating an arrangement of the touch sensing electrodes 3 which are provided on the TFT substrate 6 in the liquid crystal display panel 1. On the TFT substrate 6, (M×N) numbers of touch sensing electrodes 3 each of which has a square shape are provided in a matrix of M rows and N columns (where each of M and N is an integer of 2 or more). The touch sensing electrodes 3 are connected with the touch panel controller 13 via respective corresponding wires (see (a) of FIG. 1).

Figure 3:
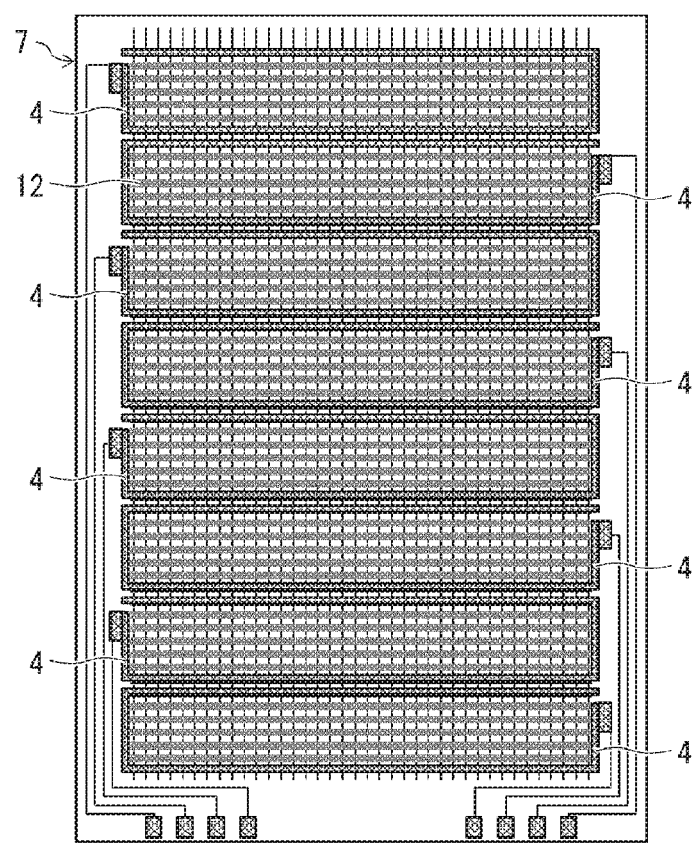
FIG. 3 is a plan view illustrating an arrangement of proximity sensing electrodes which are provided on a CF substrate in the liquid crystal display panel.
Figure 4:
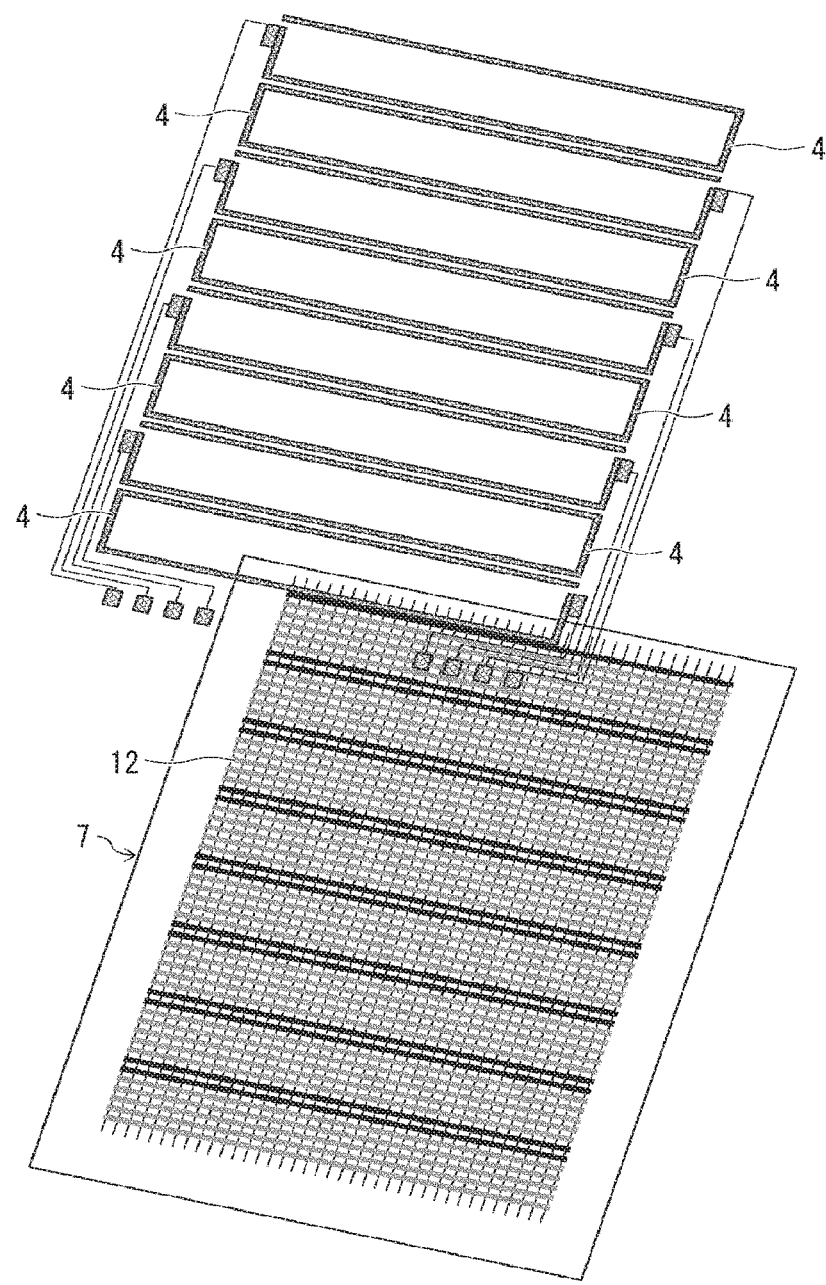
FIG. 4 is a view illustrating a black matrix and the proximity sensing electrodes which are provided on the CF substrate.
Figure 5:
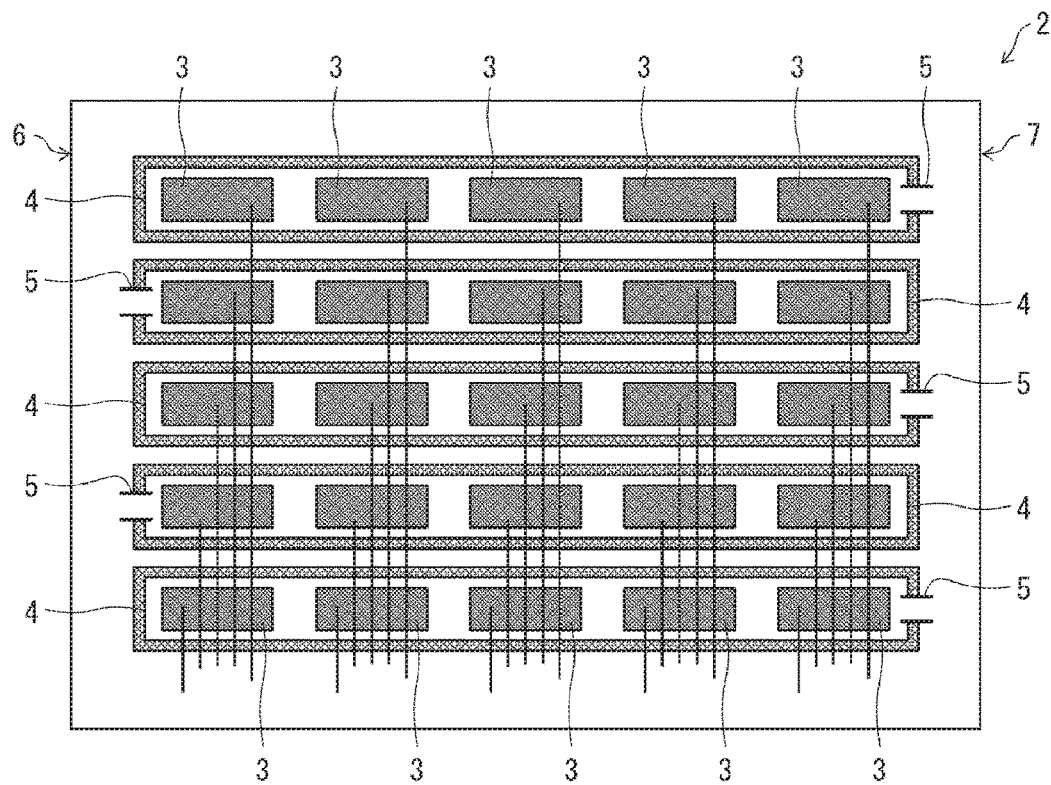
FIG. 5 is a plan view for explaining a relation between the touch sensing electrodes and the proximity sensing electrodes.

FIG. 3 is a plan view illustrating an arrangement of the proximity sensing electrodes 4 which are provided on the CF substrate 7 in the liquid crystal display panel 1. FIG. 4 is a view illustrating a black matrix 12 and the proximity sensing electrodes 4 which are provided on the CF substrate 7. FIG. 5 is a plan view for explaining a relation between the touch sensing electrodes 3 and the proximity sensing electrodes 4.

The CF substrate 7 is provided, on its liquid crystal layer 8 side, with (i) a color filter 11 (see (b) of FIG. 1) in which color filter layers are cyclically provided and (ii) a black matrix 12 that is provided in a lattice pattern so as to partition the color filter layers.

M number of the proximity sensing electrodes 4 are provided. When the CF substrate 7 is viewed in a direction perpendicular to the CF substrate 7, each of the proximity sensing electrodes 4 substantially has a U-shape that surrounds N number of touch sensing electrodes 3 provided in one (1) row and N columns out of the plurality of touch sensing electrodes 3 which are provided in the matrix of M rows and N columns. Each of the proximity sensing electrodes 4 is formed to have a resonance frequency of the coil 10. In order to specify the resonance frequency of each of the proximity sensing electrodes 4, a resonance frequency capacitor 5 is provided which is connected with one end and the other end of each of the proximity sensing electrodes 4 that substantially has a U-shape. As illustrated in FIG. 5, resonance frequency capacitors 5 which correspond to respective proximity sensing electrodes 4 surrounding touch sensing electrodes 3 in odd-numbered rows are provided on the right side in FIG. 5, and resonance frequency capacitors which correspond to respective proximity sensing electrodes 4 surrounding touch sensing electrodes 3 in even-numbered rows are provided on the left side in FIG. 5.

The proximity sensing electrodes 4 are provided on the CF substrate 7 at locations that correspond to the black matrix 12 (see FIG. 3). Each of the proximity sensing electrodes 4 which is formed in a loop-like shape serves as an RCL circuit that resonates at a resonance frequency of the coil 10.

Each of the proximity sensing electrodes 4 is preferably made of indium tin oxide (ITO). Each of the proximity sensing electrodes 4 can be made of metal.

With use of a capacitance type touch panel, a user can access information by a simple touch with the finger. Therefore, the capacitance type touch panel is becoming a general interface in portable apparatuses. The capacitance type touch panels are also generally used in vending machines and other electronic apparatuses such as household electrical appliances. Moreover, a new generation technique of connection devices known as Internet of Things is becoming popular. With such a new generation technique, connections between different devices are common, and devices themselves will soon need to be connected with each other via touch panels.

However, although a conventional capacitance type touch panel functions well with a finger touch, the conventional capacitance type touch panel has a problem in operation with a pen input device and other devices. A pen which is most often used employs magnetic induction sensing for achieving good performance. Therefore, in a hovering state in which the pen is slightly off from the capacitance type touch panel, the touch panel cannot achieve sufficiently good performance because the capacitance type touch panel detects also proximity of another device.

In Embodiment 1, at least one sensing electrode layer is provided which is constituted by a group of the touch sensing electrodes 3 and a group of the proximity sensing electrodes 4 each of which has the loop-like shape. Each of the proximity sensing electrodes 4 having the loop-like shape is preferably provided so as to surround at least one touch sensing electrode 3.

Each of the proximity sensing electrodes 4 having the loop-like shape accepts magnetic coupling to another input device such as a pen, a card, or a tag. A signal for magnetic induction sensing is modulated with a touch panel signal. In a case where the RFID device 9 having the coil 10 (see FIG. 6) has been magnetically coupled to a proximity sensing electrode 4 having the loop-like shape in the touch panel 2, a magnetic flux changes, and consequently an induced voltage occurs in a touch sensing electrode 3. This change can be detected by the touch panel controller 13. From this, a location of the RFID device 9 which has touched the touch panel 2 is detected, and the RFID device 9 is easily identified.

In Embodiment 1, the liquid crystal display panel 1 includes the touch panel 2. In the liquid crystal display panel 1, a first sensing array (i.e., the touch sensing electrodes 3) constituted by segments patterned on the TFT substrate 6 is provided, and a second sensing array (i.e., the proximity sensing electrodes 4) constituted by an array of loop-like-shaped electrodes patterned on the CF substrate 7 is provided. Each of loop electrodes (i.e., the proximity sensing electrodes 4) is preferably provided so as to surround segment electrodes (i.e., the touch sensing electrodes 3). The segment electrodes (i.e., the touch sensing electrodes 3) are connected with the touch panel controller 13 and detect a subject of a touch.

(Operation of Proximity Sensing Electrode 4 and Touch Sensing Electrode 3)

Figure 6:
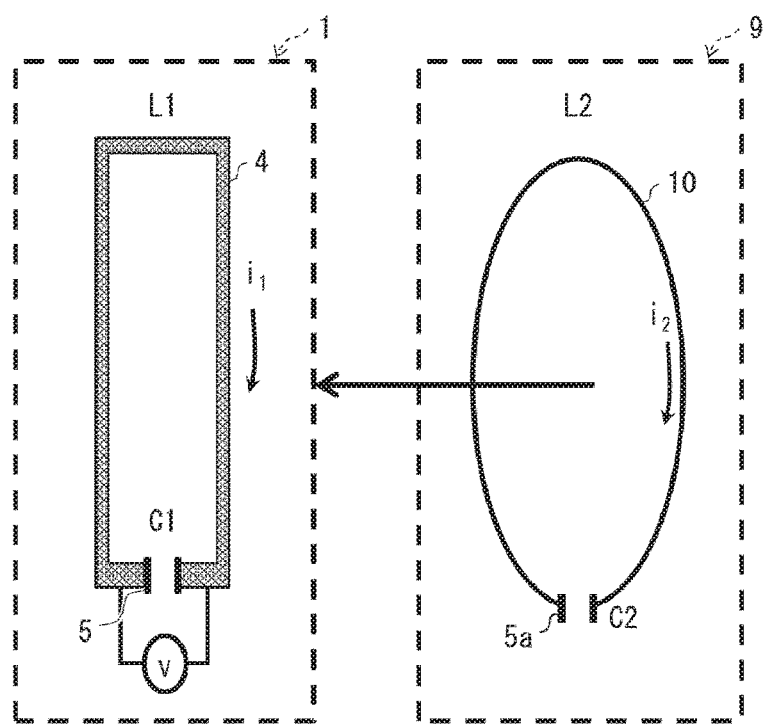
FIG. 6 is a schematic view for explaining an operation of the proximity sensing electrode.
Figure 7:
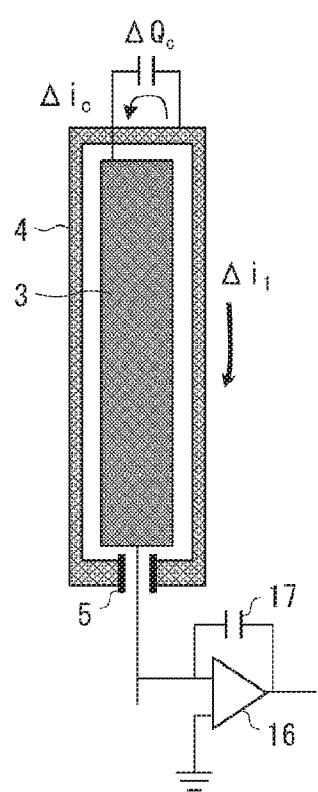
FIG. 7 is a schematic view for explaining operations of the proximity sensing electrode and the touch sensing electrode.

FIG. 6 is a schematic view for explaining an operation of the proximity sensing electrode 4. FIG. 7 is a schematic view for explaining operations of the proximity sensing electrode 4 and the touch sensing electrode 3.

In a case where the RFID device 9, which includes the coil 10 having the resonance frequency of the proximity sensing electrode 4 forming an electrical loop, has approached the touch panel 1 while causing high frequency emanation, a magnetic flux in the proximity sensing electrode 4 changes. This causes induced electromotive force. From this, a coupling charge changes in the proximity sensing electrode 4. A change $\Delta Q_c$ in coupling charge between the proximity sensing electrode 4 and the touch sensing electrode 3 is detected by the touch panel controller 13 which controls the touch panel 1. Thus, a location of the RFID device 9, which is causing the high frequency emanation, on the touch panel 1 is detected, and the RFID device 9 and a user of the RFID device 9 are easily identified.

A signal for identifying the user is generated by use of the touch panel controller 13. In a case where the RFID device 9 including the coil 10 has approached the touch panel 1, a mutual inductance occurs between the RFID device 9 and the proximity sensing electrode 4. Due to change in induced current, an electric charge that is transferred from the proximity sensing electrode 4 to the touch sensing electrode 3 changes. Therefore, a resonance occurs in the proximity sensing electrode 4 forming the electrical loop, and a change $\Delta Q_c$ in coupling capacitance is induced between the proximity sensing electrode 4 and the touch sensing electrode 3.

The loop shape of the proximity sensing electrode 4 enhances an inductance in the proximity sensing electrode 4. The proximity sensing electrode 4 is further coupled to an electrostatic capacitor so as to conform to a predetermined resonance frequency.

As a result of inductive coupling between (i) the proximity sensing electrode 4 which has the loop-like shape and to which an AC signal is supplied and (ii) the coil 10 included in the RFID device 9, a magnetic flux that flows through the coil 10 and the proximity sensing electrode 4 changes. From this, electromotive force (emf) is induced as indicated in the following (Formula 1) through (Formula 3), and thus a self-inductance voltage changes.

[Math. 1]

$$\text{emf} = v = \frac{d\Phi}{dt} \quad \text{(Formula 1)}$$

$$v = L_1 \frac{di_1}{dt} - M \frac{di_2}{dt} \quad \text{(Formula 2)}$$

$$M = k\sqrt{L_1 L_2} \quad \text{(Formula 3)}$$

The proximity sensing electrode 4 which is located on an outer side is coupled to the touch sensing electrode 3 which is located on an inner side via the electrostatic capacitor which has been given. Due to a change in induced current in the proximity sensing electrode 4 having the loop-like shape, flows of an electric current and of an electric charge change in the touch sensing electrode 3 which is located on the inner side. An electric current signal which has been read out from the touch sensing electrode 3 is amplified by an amplifier 16 that includes an integral capacitor 17. Proximity of the coil 10 is detected based on the electric current signal which has been amplified by the amplifier 16.

Figure 8:
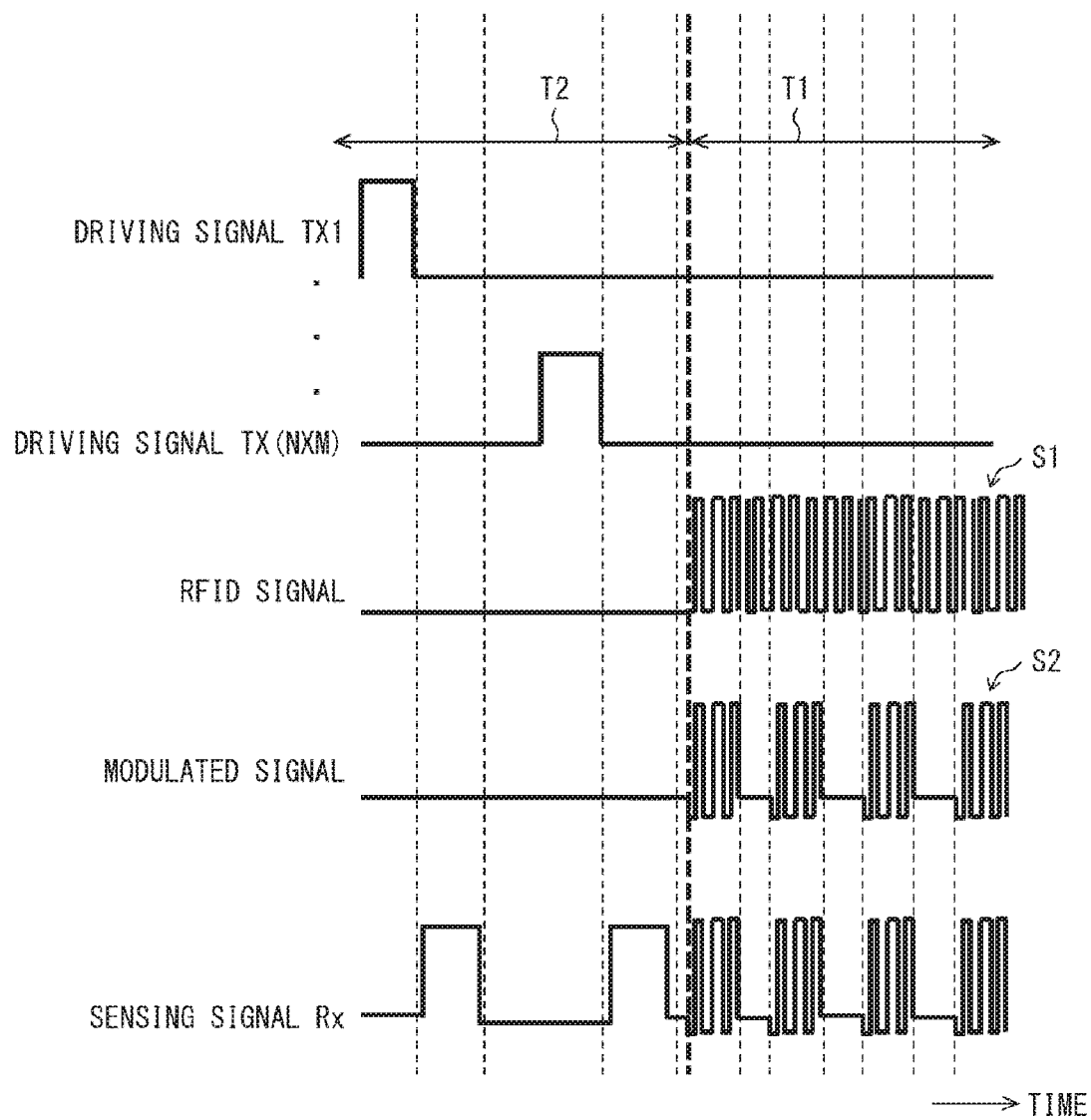
FIG. 8 is a timing chart showing an operation of the liquid crystal display panel.

FIG. 8 is a timing chart showing an operation of the liquid crystal display panel 1. The touch panel controller 13 illustrated in FIG. 1 applies, to the touch sensing electrodes 3 illustrated in FIG. 2, respective driving signals $TX_1$ through $TX_{(N \times M)}$ in a vertical blanking period T2 of the liquid crystal display panel 1. Then, in the vertical blanking period T2, the touch panel controller 13 reads out sensing signals RX corresponding to the respective driving signals $TX_1$ through $TX_{(N \times M)}$ from the respective touch sensing electrodes 3. As such, detection of a finger touch by use of the touch sensing electrodes 3 is carried out in the vertical blanking period T2 based on a self-capacitance system.

Detection of the RFID device 9 by the proximity sensing electrodes 4 is preferably carried out in a scanning period T1 of the liquid crystal display panel 1. In the scanning period T1, the electromagnetic signal generator 15 generates an RFID signal S1 and supplies the RFID signal S1 to the modulator 14. The modulator 14 generates a modulated signal S2 by superimposing the RFID signal S1 generated by the electromagnetic signal generator 15 on a transmission signal generated by the touch panel controller 13, and supplies the modulated signal S2 to the proximity sensing electrode 4. As such, the modulator 14 outputs the modulated signal S2 which has a high frequency as a carrier frequency and includes an envelope signal that is similar to the transmission signal supplied from the touch panel controller 13.

In a case where the RFID device 9, which includes the coil 10 having the resonance frequency corresponding to the resonance frequency of the proximity sensing electrode 4, has approached the proximity sensing electrode 4 in the scanning period T1, inductive coupling occurs and an amplitude of the modulated signal S2 supplied to the proximity sensing electrode 4 and an amplitude of the sensing signal RX read out by the touch panel controller 13 from the touch sensing electrode 3 change.

In the vertical blanking period T2 for detecting a finger touch, the touch panel controller 13 operates in a self-capacitance detection mode. Meanwhile, in the scanning period T1 for detecting the RFID device 9, the touch panel controller 13 operates in a mutual capacitance detection mode.

In a case where (i) the RFID device 9 (such as an RFID card or device) has been detected, in the scanning period T1, by the touch sensing electrode 3 and (ii), in the following vertical blanking period T2, the proximity sensing electrode 4 which is located so as to correspond to the RFID device 9 which has been detected is configured to receive a modulated signal S2 from the modulator 14, a response speed for detecting the RFID device 9 becomes faster as compared with a configuration in which modulated signals S2 are sequentially supplied to all the respective proximity sensing electrodes 4. Moreover, power consumption is reduced and performance of an RFID signal is improved, in a case where (i) the RFID device 9 (such as an RFID card or device) has been detected by the touch sensing electrode 3 in the scanning period T1 and (ii) an operation of the touch panel controller 13, which operation is for sensing a finger, is halted in the following vertical blanking period T2.

In Embodiment 1, an example has been described in which the touch sensing electrodes 3 are provided on the TFT substrate 6 and the proximity sensing electrodes 4 are provided on the CF substrate 7. Note, however, that the present invention is not limited to this example, provided that the touch sensing electrodes 3 and the proximity sensing electrodes 4 are embedded in the liquid crystal display panel. For example, the touch sensing electrodes 3 merely need to be provided on at least one of the TFT substrate 6 and the CF substrate 7, and the proximity sensing electrodes 4 also merely need to be provided on at least one of the TFT substrate 6 and the CF substrate 7. The same applies to the subsequently described embodiments.

Embodiment 2

The following description will discuss another embodiment of the present invention with reference to FIG. 9. For convenience, identical reference numerals are given to constituent members having functions identical with those of the constituent members described in the foregoing embodiment, and descriptions of such constituent members are omitted here.

(a) of FIG. 9 is a perspective view schematically illustrating a configuration of a liquid crystal display panel 1a in accordance with Embodiment 2, and (b) of FIG. 9 is a cross-sectional view of the liquid crystal display panel 1a.

In the liquid crystal display panel 1a, proximity sensing electrodes 4 are provided on a side of a CF substrate 7 which side is opposite to a liquid crystal layer 8. The other parts of the configuration are the same as those of the liquid crystal display panel 1 in accordance with Embodiment 1.

In a case where the proximity sensing electrodes 4 are provided on the side of the CF substrate 7 which side is opposite to the liquid crystal layer 8, a distance becomes shorter between a proximity sensing electrode 4 and a coil 10 included in an RFID device 9 that is approaching the liquid crystal display panel 1a, as compared with the configuration in which the proximity sensing electrodes 4 are provided on the liquid crystal layer 8 side of the CF substrate 7. From this, a change in magnetic flux in the proximity sensing electrode 4 becomes greater. As a result, greater induced electromotive force occurs. This increases a change in a coupling charge occurring in the proximity sensing electrode 4. This makes it possible to more surely detect proximity of the RFID device 9, as compared with the configuration in which the proximity sensing electrodes 4 are provided on the liquid crystal layer 8 side of the CF substrate 7.

Embodiment 3

(a) of FIG. 10 is a perspective view schematically illustrating a configuration of a liquid crystal display panel 1b in accordance with Embodiment 3, and (b) of FIG. 10 is a cross-sectional view of the liquid crystal display panel 1b.

In the liquid crystal display panel 1b, proximity sensing electrodes 4 are provided on a liquid crystal layer 8 side of a CF substrate 7 and also on a side of the CF substrate 7 which side is opposite to the liquid crystal layer 8. The other parts of the configuration are the same as those of the liquid crystal display panel 1 in accordance with Embodiment 1.

Touch sensing electrodes 3 each of which has a square shape are provided on a surface of a TFT substrate 6 in a matrix of M rows (extending in a Y direction) and N columns (extending in an X direction). M numbers of proximity sensing electrodes 4 are provided on the liquid crystal layer 8 side of the CF substrate 7 when the CF substrate 7 is viewed in a direction perpendicular to the CF substrate 7. Each of the M number of proximity sensing electrodes 4 substantially has a U-shape that surrounds M number of touch sensing electrodes 3 provided in M rows and one (1) column. On the side of the CF substrate 7 which side is opposite to the liquid crystal layer 8, M number of proximity sensing electrodes 4b are provided. Each of the M number of proximity sensing electrodes 4b substantially has a U-shape that surrounds N number of touch sensing electrodes 3 provided in one (1) row and N columns.

As such, two or more numbers of the proximity sensing electrodes 4 are provided in the X direction, and therefore the touch panel controller 13 can detect a location of an approaching RFID device 9 in the X direction. Moreover, two or more numbers of the proximity sensing electrodes 4b are provided in the Y direction, and therefore the touch panel controller 13 can detect a location of the approaching RFID device 9 in the Y direction. This allows the touch panel controller 13 to identify an X coordinate and a Y coordinate of the approaching RFID device 9 on the touch panel 1b.

Embodiment 4

FIG. 11 is a plan view illustrating a configuration of a touch panel 2c in accordance with Embodiment 4. In the touch panel 2c, a proximity sensing electrode 4c is further provided on a peripheral edge of a TFT substrate 6 so as to surround a plurality of proximity sensing electrodes 4. In order to specify a resonance frequency of the proximity sensing electrode 4c, a resonance frequency capacitor 5c is provided which is connected with one end and the other end of the proximity sensing electrode 4c. The other parts of the configuration are the same as those of the touch panel 2 in accordance with Embodiment 1.

In a case where the proximity sensing electrode 4c is thus additionally provided, when an RFID device 9 has approached, a change in magnetic flux occurs in the proximity sensing electrode 4c in addition to a change in magnetic flux in a proximity sensing electrode 4, as compared with the configuration in which only the proximity sensing electrodes 4 are provided. From this, a coupling charge changes in the proximity sensing electrode 4c, in addition to a change in coupling charge which change occurs in the proximity sensing electrode 4. This makes it possible to more surely detect proximity of the RFID device 9, as compared with the configuration in which only the proximity sensing electrodes 4 are provided.

Embodiment 5

FIG. 12 is a plan view illustrating a configuration of a touch panel 2d in accordance with Embodiment 5. Instead of the proximity sensing electrodes 4 each of which surrounds N number of touch sensing electrodes 3 provided in one (1) row and N columns in accordance with Embodiment 1 (see FIG. 5), proximity sensing electrodes 4d which surround respective touch sensing electrodes 3 are provided. Further, a proximity sensing electrode 4c is provided so as to surround all the proximity sensing electrodes 4d. In order to specify a resonance frequency of the proximity sensing electrode 4c, a resonance frequency capacitor 5c is provided which is connected with one end and the other end of the proximity sensing electrode 4c. The other parts of the configuration are the same as those of the touch panel 2 in accordance with Embodiment 1.

In a case where the proximity sensing electrodes 4d which surround the respective touch sensing electrodes 3 are thus provided, a change $\Delta Q_c$ in coupling charge between a proximity sensing electrode and a touch sensing electrode (see FIG. 7) becomes larger, as compared with the configuration in which the proximity sensing electrodes 4 each of which surrounds the touch sensing electrodes 3 provided in one (1) row and N columns are provided. Consequently, it is possible to more surely detect proximity of the RFID device 9.

[Recap]

The display with a built-in touch panel (liquid crystal display panel 1, 1a, 1b) in accordance with an aspect 1 of the present invention includes: a touch panel (2, 2b, 2d); and a display (liquid crystal display panel 1, 1a, 1b) with the touch panel (2, 2b, 2d), the display (liquid crystal display panel 1, 1a, 1b) including (i) a circuit substrate (TFT substrate 6), (ii) a counter substrate (CF substrate 7) which is provided so as to face the circuit substrate (TFT substrate 6), and (iii) a liquid crystal layer (8) which is provided between the circuit substrate (TFT substrate 6) and the counter substrate (CF substrate 7), the touch panel (2, 2b, 2d) including a plurality of touch sensing electrodes (3) and a proximity sensing electrode (4, 4b, 4c, 4d), the plurality of touch sensing electrodes (3) being provided on at least one of the circuit substrate (TFT substrate 6) and the counter substrate (CF substrate 7) so as to detect an electric capacitance between the touch panel (2, 2b, 2d) and a subject of a touch or a change in the electric capacitance, the proximity sensing electrode (4, 4b, 4c, 4d) being provided on at least one of the circuit substrate (TFT substrate 6) and the counter substrate (CF substrate 7) so as to detect proximity of a coil (10).

According to the configuration, the proximity sensing electrode for detecting proximity of the coil is provided on at least one of the circuit substrate and the counter substrate which are included in the display. As such, the proximity sensing electrode for detecting proximity of the coil is embedded in the display. According to the arrangement, it is not necessary to newly add a member for recognizing proximity of the coil, and it is possible to avoid an increase in material cost and production cost for recognizing proximity of the coil. This makes it possible to provide a display with a built-in touch panel that can recognize proximity of a coil without an increase in material cost and production cost.

According to the display with a built-in touch panel (liquid crystal display panel 1, 1a, 1b) in accordance with an aspect 2 of the present invention, it is possible in the aspect 1 that the plurality of touch sensing electrodes (3) are provided on the circuit substrate (TFT substrate 6); and the proximity sensing electrode (4, 4b, 4c, 4d) is provided on the counter substrate (CF substrate 7).

According to the configuration, the proximity sensing electrode is provided on the counter substrate that is nearer to an approaching coil than the circuit substrate is, and it is therefore possible to more surely detect proximity of the coil.

According to the display with a built-in touch panel (liquid crystal display panel 1, 1a, 1b) in accordance with an aspect 3 of the present invention, it is possible in the aspect 1 or 2 that the plurality of touch sensing electrodes (3) are provided in a matrix of M rows and N columns (where each of M and N is an integer of 2 or more); and the proximity sensing electrode (4, 4b, 4c, 4d) is provided so as to surround at least one of the plurality of touch sensing electrodes (3) when the counter substrate (CF substrate 7) is viewed from a direction perpendicular to the counter substrate (CF substrate 7).

According to the configuration, the proximity sensing electrode is provided so as to surround the touch sensing electrode, and therefore a distance between the proximity sensing electrode and the touch sensing electrode becomes shorter. This increases a change $\Delta Q_c$ in coupling charge between the proximity sensing electrode and the touch sensing electrode. Consequently, it is possible to more surely detect proximity of the coil.

According to the display with a built-in touch panel (liquid crystal display panel 1, 1a, 1b) in accordance with an aspect 4 of the present invention, it is possible in the aspect 3 that: M number of proximity sensing electrodes (4) are provided as the proximity sensing electrode (4); and, when the counter substrate (CF substrate 7) is viewed from the direction perpendicular to the counter substrate (CF substrate 7), each of the M number of proximity sensing electrodes (4) is provided so as to surround touch sensing electrodes (3) which are provided in one (1) row and N columns out of the plurality of touch sensing electrodes (3) which are provided in the matrix of M rows and N columns.

According to the configuration, the proximity sensing electrode is provided so as to surround the N number of touch sensing electrodes in one (1) row and N columns, and therefore a distance between the proximity sensing electrode and the N number of touch sensing electrodes becomes shorter. This increases a change $\Delta Q_c$ in coupling charge between the proximity sensing electrode and the N number of touch sensing electrodes. Consequently, it is possible to more surely detect proximity of the coil.

According to the display with a built-in touch panel (liquid crystal display panel 1, 1a, 1b) in accordance with an aspect 5 of the present invention, it is possible in any one of the aspects 1 through 4 that the coil (10) is provided in an RFID device (9).

According to the configuration, it is possible to detect proximity of the RFID device.

According to the display with a built-in touch panel (liquid crystal display panel 1, 1a, 1b) in accordance with an aspect 6 of the present invention, it is possible in any one of the aspects 1 through 5 that the proximity sensing electrode (4, 4b, 4c, 4d) has a resonance frequency of the coil (10).

According to the configuration, the proximity sensing electrode resonates with the coil in response to proximity of the coil. From this, a coupling charge between the proximity sensing electrode and the touch sensing electrode changes. Further, a signal read out from each of the touch sensing electrodes changes in response to the change in coupling charge, and it is thus possible to detect proximity of the coil.

According to the display with a built-in touch panel (liquid crystal display panel 1, 1a, 1b) in accordance with an aspect 7 of the present invention, it is possible in any one of the aspects 1 through 6 that the proximity sensing electrode (4, 4b, 4c, 4d) is made of indium tin oxide (ITO).

According to the configuration, the proximity sensing electrode is transparent, and this makes it possible to improve viewability of display on the display with a built-in touch panel.

According to the display with a built-in touch panel (liquid crystal display panel 1, 1a, 1b) in accordance with an aspect 8 of the present invention, it is possible in any one of the aspects 1 through 7 that the display with a built-in touch panel (liquid crystal display panel 1, 1a, 1b) further includes: a color filter (11) in which color filter layers are cyclically provided on the counter substrate (CF substrate 7) of a liquid crystal layer (8) side; and a black matrix (12) that is provided in a lattice pattern so as to partition the color filter layers, the proximity sensing electrode (4, 4b, 4c, 4d) being provided so as to correspond to the black matrix (12).

According to the configuration, the proximity sensing electrode can be covered with the black matrix, and this makes it possible to improve viewability of display on the display with a built-in touch panel.

According to the display with a built-in touch panel (liquid crystal display panel 1, 1a, 1b) in accordance with an aspect 9 of the present invention, it is possible in any one of the aspects 1 through 8 that the proximity sensing electrode (4, 4b, 4c, 4d) has a U-shape, the display with a built-in touch panel (liquid crystal display panel 1, 1a, 1b) further includes a resonance frequency capacitor (5, 5a, 5c) for specifying a resonance frequency of the proximity sensing electrode (4, 4b, 4c, 4d), the resonance frequency capacitor (5, 5a, 5c) being connected with one end and the other end of the proximity sensing electrode (4, 4b, 4c, 4d).

According to the configuration, it is possible to specify, based on an electrostatic capacitance of the resonance frequency capacitor, a resonance frequency of the proximity sensing electrode which resonates with the coil.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST

1: Liquid crystal display panel (display with a built-in touch panel, display)
2: Touch panel
3: Touch sensing electrode
4: Proximity sensing electrode
5: Resonance frequency capacitor
6: TFT substrate (circuit substrate)
7: CF substrate (counter substrate)
8: Liquid crystal layer
9: RFID device
10: Coil
11: Color filter
12: Black matrix

The invention claimed is:

1. A display with a built-in touch panel comprising:
a touch panel; and
a display with the touch panel,
said display including (i) a circuit substrate, (ii) a counter substrate which is provided so as to face the circuit substrate, and (iii) a liquid crystal layer which is provided between the circuit substrate and the counter substrate,
said touch panel including a plurality of touch sensing electrodes and a proximity sensing electrode,
the plurality of touch sensing electrodes being provided on at least one of the circuit substrate and the counter substrate so as to detect an electric capacitance between the touch panel and a subject of a touch or a change in the electric capacitance,
the proximity sensing electrode being provided on at least one of the circuit substrate and the counter substrate so as to detect proximity of a coil,
the plurality of touch sensing electrodes being (M×N) touch sensing electrodes and being provided in a matrix of M rows and N columns, each of M and N being an integer of 2 or more,
the proximity sensing electrode is provided so as to surround at least one of the plurality of touch sensing electrodes when the counter substrate is viewed from a direction perpendicular to the counter substrate,
M number of proximity sensing electrodes are provided as the proximity sensing electrode, and
when the counter substrate is viewed from the direction perpendicular to the counter substrate, each of the M number of proximity sensing electrodes is provided so as to surround touch sensing electrodes which are provided in one (1) row and N columns out of the (M×N) touch sensing electrodes which are provided hi the matrix of M rows and N columns.

2. The display with a built-in touch panel as set forth in claim 1, wherein:
the (M×N) touch sensing electrodes are provided on the circuit substrate; and
the proximity sensing electrode is provided on the counter substrate.

3. The display with a built-in touch panel as set forth in claim 1, wherein the coil is provided in an RFID device.

4. The display with a built-in touch panel as set forth in claim 1, wherein the proximity sensing electrode has a resonance frequency of the coil.

5. The display with a built-in touch panel as set forth in claim 1, wherein the proximity sensing electrode is made of indium tin oxide (ITO).

6. A display with a built-in touch panel as set forth in claim 1, further comprising:
a color filter in which color filter layers are cyclically provided on the counter substrate of a liquid crystal layer side; and
a black matrix that is provided in a lattice pattern so as to partition the color filter layers,
the proximity sensing electrode being provided so as to correspond to the black matrix.

7. The display with a built-in touch panel as set forth in claim 1, wherein the proximity sensing electrode has a U-shape,
said display with a built-in touch panel further comprising:
a resonance frequency capacitor for specifying a resonance frequency of the proximity sensing electrode,
said resonance frequency capacitor being connected with one end and the other end of the proximity sensing electrode.

* * * * *